United States Patent
Tu et al.

(10) Patent No.: US 9,843,092 B2
(45) Date of Patent: Dec. 12, 2017

(54) MOBILE DEVICE

(71) Applicant: Quanta Computer Inc., Taoyuan (TW)

(72) Inventors: Shu-Yang Tu, Taoyuan (TW); Chun-I Lin, Taoyuan (TW); Hui Lin, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 0 days.

(21) Appl. No.: 15/177,986

(22) Filed: Jun. 9, 2016

(65) Prior Publication Data

US 2017/0309993 A1    Oct. 26, 2017

(30) Foreign Application Priority Data

Apr. 22, 2016 (TW) .............................. 105112562 A

(51) Int. Cl.
| | |
|---|---|
| *H01Q 1/24* | (2006.01) |
| *H01Q 13/10* | (2006.01) |
| *H04M 1/02* | (2006.01) |
| *H01Q 1/50* | (2006.01) |

(52) U.S. Cl.
CPC .............. *H01Q 1/243* (2013.01); *H01Q 1/50* (2013.01); *H01Q 13/10* (2013.01); *H04M 1/0274* (2013.01); *H04M 1/0277* (2013.01)

(58) Field of Classification Search
CPC ........ H01Q 13/10; H01Q 1/243; H01Q 5/335; H01Q 1/38
See application file for complete search history.

(56) References Cited

U.S. PATENT DOCUMENTS

| | | | | |
|---|---|---|---|---|
| 6,025,803 A | * | 2/2000 | Bergen | H01Q 1/246 343/700 MS |
| 6,075,485 A | * | 6/2000 | Lilly | H01Q 1/38 343/700 MS |
| 6,081,241 A | * | 6/2000 | Josefsson | H01P 5/107 333/26 |
| 6,473,042 B1 | | 10/2002 | Fang et al. | |
| 2008/0191950 A1 | * | 8/2008 | Chang | H01Q 1/276 343/718 |
| 2011/0241948 A1 | * | 10/2011 | Bevelacqua | H01Q 1/243 343/702 |
| 2015/0097745 A1 | | 4/2015 | Chou et al. | |
| 2015/0255851 A1 | | 9/2015 | Guterman et al. | |
| 2015/0263430 A1 | | 9/2015 | Lin et al. | |

FOREIGN PATENT DOCUMENTS

| | | |
|---|---|---|
| TW | 201515322 A | 4/2015 |
| TW | 201537829 A | 10/2015 |

OTHER PUBLICATIONS

Chinese language office action dated Mar. 31, 2017, issued in application No. TW 105112562.

* cited by examiner

*Primary Examiner* — Tho G Phan
(74) *Attorney, Agent, or Firm* — McClure, Qualey & Rodack, LLP

(57) ABSTRACT

A mobile device includes a metal cavity, a dielectric substrate, and a feeding element. A slot is formed on a side wall of the metal cavity. The dielectric substrate is disposed in the metal cavity. The feeding element is disposed on the dielectric substrate, and is electrically connected to a signal source. A slot antenna structure is formed by the metal cavity, the dielectric substrate, and the feeding element.

11 Claims, 5 Drawing Sheets

MOBILE DEVICE

CROSS REFERENCE TO RELATED APPLICATIONS

This Application claims priority of Taiwan Patent Application No. 105112562 filed on Apr. 22, 2016, the entirety of which is incorporated by reference herein.

BACKGROUND OF THE INVENTION

Field of the Invention

The disclosure generally relates to a mobile device, and specifically, to a mobile device and a slot antenna structure therein.

Description of the Related Art

With the progress being made in mobile communication technology, mobile devices such as portable computers, mobile phones, tablet computers, multimedia players, and other hybrid functional mobile devices have become common. To satisfy the demand of users, mobile devices can usually perform wireless communication functions. Some functions cover a large wireless communication area; for example, mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some functions cover a small wireless communication area; for example, mobile phones using Wi-Fi and Bluetooth systems and using frequency bands of 2.4 GHz, 5.2 GHz, and 5.8 GHz.

Antennas are indispensable components for mobile devices supporting wireless communication. However, antennas tend to be affected by nearby metal elements. For example, when convertible mobile devices operate in different modes, their relative positions of inner antenna elements and metal elements are changed, such that the antenna elements are affected and the total communication quality is degraded accordingly. As a result, there is a need to propose a novel solution for overcoming the problems of the prior art.

BRIEF SUMMARY OF THE INVENTION

In a preferred embodiment, the disclosure is directed to a mobile device including a metal cavity, a dielectric substrate, and a feeding element. A slot is formed on a side wall of the metal cavity. The dielectric substrate is disposed in the metal cavity. The feeding element is disposed on the dielectric substrate, and is electrically connected to a signal source. A slot antenna structure is formed by the metal cavity, the dielectric substrate, and the feeding element.

In some embodiments, the dielectric substrate has an upper surface and a lower surface. The upper surface of the dielectric substrate is attached to the side wall. The feeding element is disposed on the lower surface of the dielectric substrate.

In some embodiments, the metal cavity is a hollow cuboid.

In some embodiments, the slot has a straight-line shape.

In some embodiments, the feeding element includes a first feeding branch and a second feeding branch. Both the first feeding branch and the second feeding branch extend across the slot.

In some embodiments, the slot antenna structure is excited to generate a first frequency band and a second frequency band. The first frequency band is from 2400 MHz to 2484 MHz. The second frequency band is from 5150 MHz to 5850 MHz.

In some embodiments, the length of the metal cavity is from 0.4 to 0.6 wavelength of the first frequency band.

In some embodiments, the width of the metal cavity is from 0.05 to 0.15 wavelength of the first frequency band.

In some embodiments, at least one small opening is further formed on a top plate of the metal cavity, and the top plate is perpendicular to the side wall.

In some embodiments, the mobile device is a convertible notebook computer which includes an upper cover, a lower cover, and a hinge element. The upper cover includes a display device. The lower cover includes a keyboard. The hinge element is electrically connected between the upper cover and the lower cover. Accordingly, the convertible notebook computer operates in a notebook mode, a tent mode, or a tablet mode. The slot antenna structure is adjacent to the hinge element, and is between the upper cover and the lower cover.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are described in detail below.

Figure 1A:
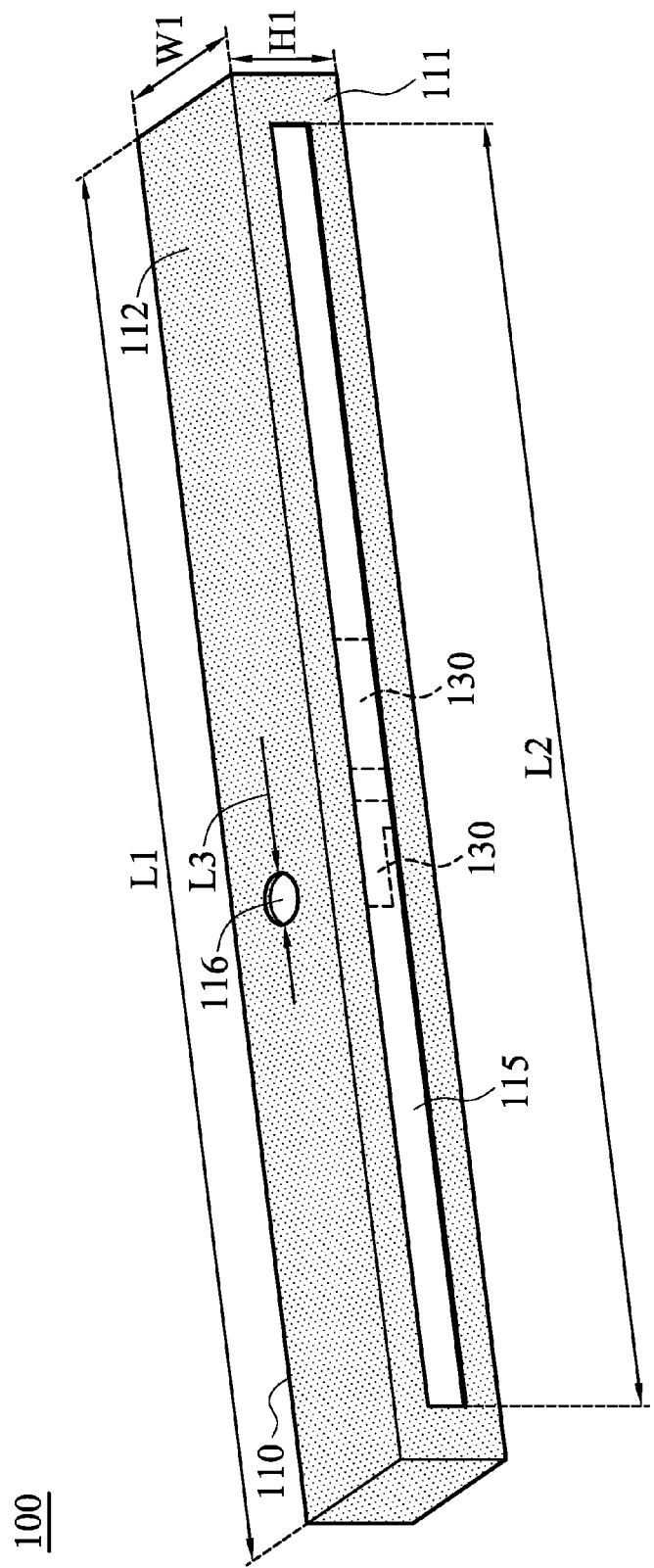
FIG. 1A is a perspective view of a mobile device according to an embodiment of the invention.
Figure 1B:
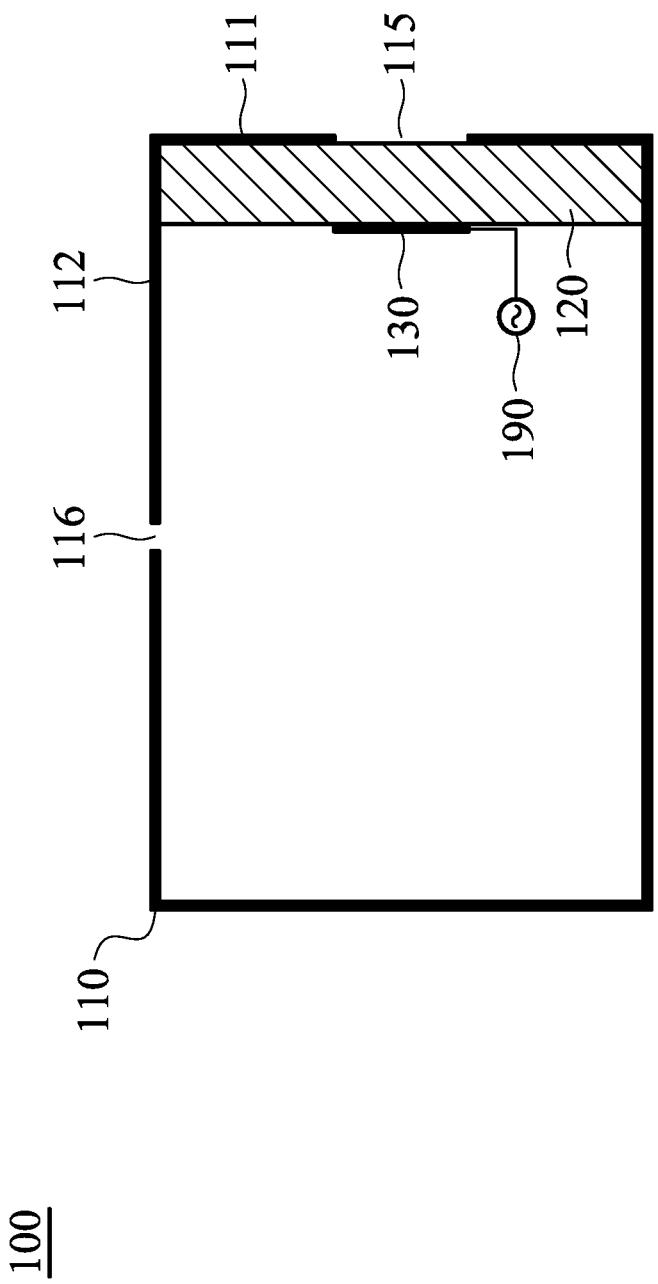
FIG. 1B is a sectional view of a mobile device according to an embodiment of the invention.

FIG. 1A is a perspective view of a mobile device 100 according to an embodiment of the invention. FIG. 1B is a sectional view of the mobile device 100 according to an embodiment of the invention. The mobile device 100 may be a smartphone, a tablet computer, or a notebook computer. As shown in FIG. 1A and FIG. 1B, the mobile device 100 at least includes a metal cavity 110, a dielectric substrate 120, and a feeding element 130. The metal cavity 110 may be a hollow cuboid, which includes a top plate, a bottom plate, and four side walls, so as to form an enclosed cavity. A slot 115 is formed on a side wall 111 of the metal cavity 110. The slot 115 may substantially have a straight-line shape. The dielectric substrate 120 is disposed in the metal cavity 110. The feeding element 130 is disposed on the dielectric substrate 120, and is electrically connected to a signal source 190. In a preferred embodiment, a slot antenna structure is formed by the metal cavity 110, the dielectric substrate 120, and the feeding element 130. The signal source 190 may be an RF (Radio Frequency) module for exciting the slot antenna structure and for performing a procedure of signal reception and transmission. It should be noted that the mobile device 100 may further include other components, such as a processor, a speaker, a touch control panel, a battery, and a housing in other embodiments although they are not displayed in FIG. 1A and FIG. 1B.

In some embodiments, at least one small opening 116 is further formed on a top plate 112 of the metal cavity 110. The top plate 112 of the metal cavity 110 is perpendicular to the side wall 111 of the metal cavity 110. For example, the small opening 116 may substantially have a circular shape, a square shape, or a triangular shape. A coaxial cable electrically connected to the signal source 190 may extend through the small opening 116 of the metal cavity 110. In other embodiments, there are more small openings 116 formed on the top plate 112 of the metal cavity 110, so as to accommodate other metal conductive lines of the mobile device 100. It should be understood that the aforementioned small opening 116 is an optional aspect of the design. In alternative embodiments, the metal cavity 110 has only a slot 115, without any small opening 116 thereon.

Figure 1C:
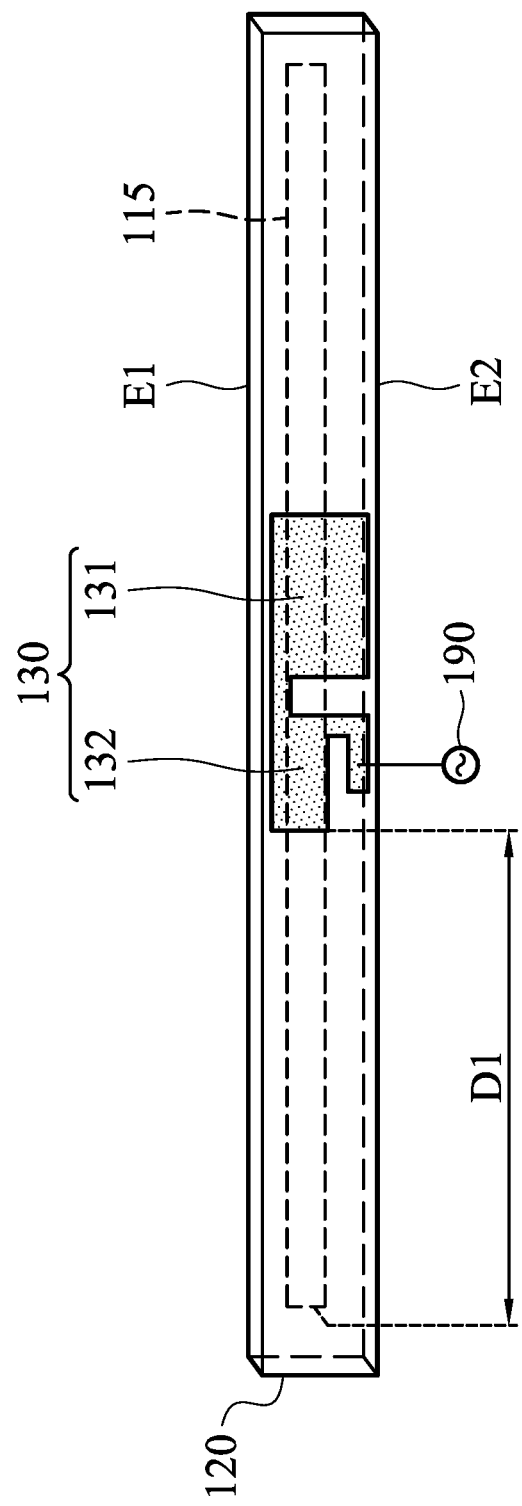
FIG. 1C is a perspective view of a dielectric substrate and a feeding element according to an embodiment of the invention.

FIG. 1C is a perspective view of the dielectric substrate 120 and the feeding element 130 according to an embodiment of the invention. In the embodiment of FIG. 1C, the dielectric substrate 120 has an upper surface E1 and a lower surface E2. The upper surface E1 of the dielectric substrate 120 is attached to the side wall 111 and the slot 115 of the metal cavity 110. The feeding element 130 is disposed on the lower surface E2 of the dielectric substrate 120. In other words, the slot 115 of the metal cavity 110 and the feeding element 130 are substantially positioned at two opposite surfaces E1 and E2 of the dielectric substrate 120, respectively. The feeding element 130 has a vertical projection which extends across the slot 115 of the metal cavity 110. Specifically, the feeding element 130 includes a first feeding branch 131 and a second feeding branch 132. Both the first feeding branch 131 and the second feeding branch 132 have vertical projections which extend across the slot 115 of the metal cavity 110. The first feeding element 131 may have a rectangular shape. The second feeding element 132 may have a C-shape. The length of the first feeding element 131 may be longer than the length of the second feeding element 132.

Figure 2:
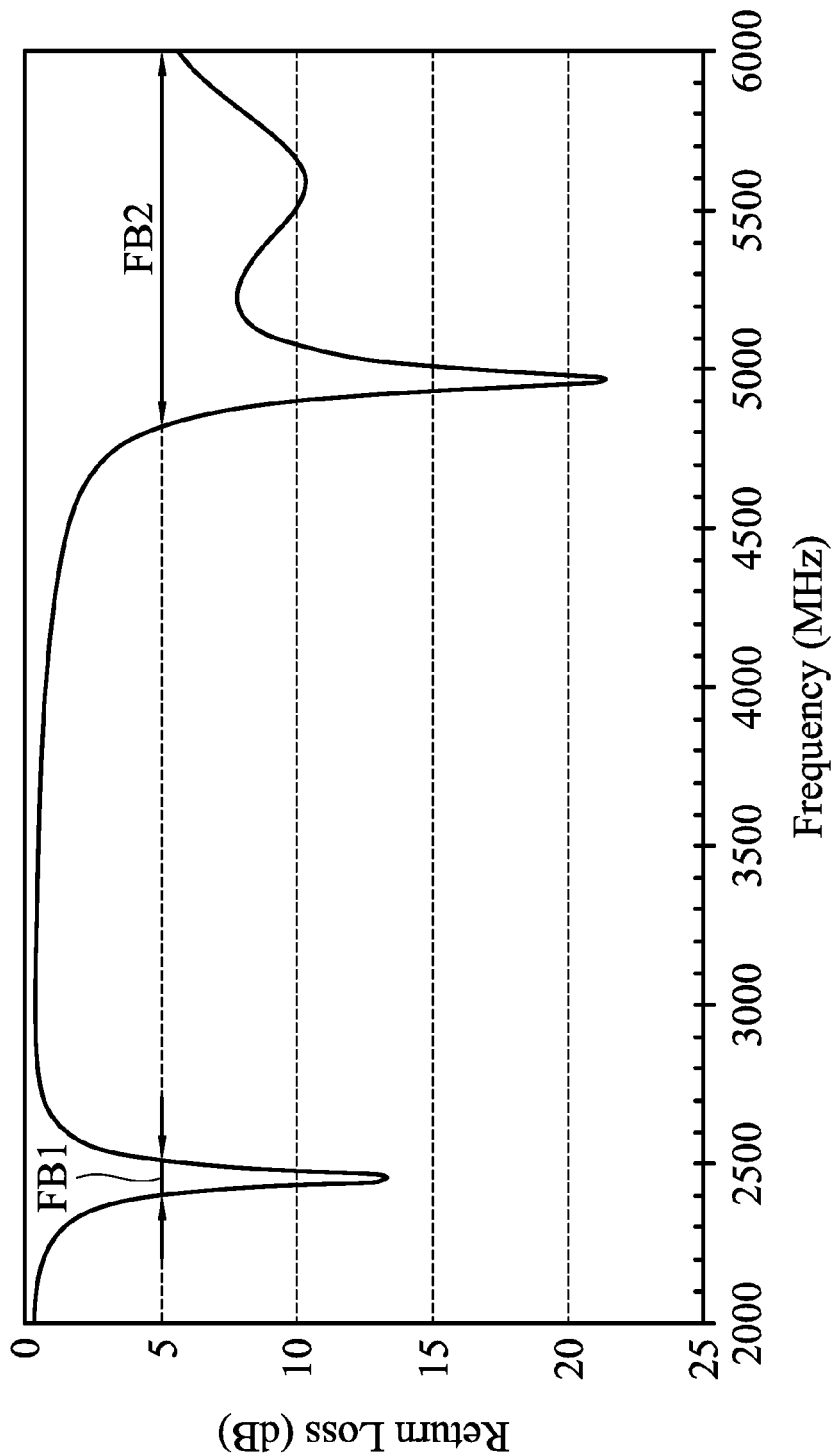
FIG. 2 is a diagram of return loss of a slot antenna structure of a mobile device according to an embodiment of the invention.

FIG. 2 is a diagram of return loss of the slot antenna structure of the mobile device 100 according to an embodiment of the invention. The horizontal axis represents the operation frequency (MHz), and the vertical axis represents the return loss (dB). In the embodiment of FIG. 2, when the slot antenna structure of the mobile device 100 is excited by the signal source 190, it generates at least a first frequency band FB1 and a second frequency band FB2. In some embodiments, the first frequency band FB1 is from 2400 MHz to 2484 MHz, and the second frequency band FB2 is from 5150 MHz to 5850 MHz. Therefore, the slot antenna structure of the mobile device 100 can cover at least the dual-frequency operation of WLAN (Wireless Local Area Networks) 2.4 GHz/5 GHz. According to practical measurements, the antenna efficiency of the slot antenna structure is greater than 28% in the first frequency band FB1, and is greater than 65% in the second frequency band FB2. It meets the requirements of general mobile communication application.

As to antenna theory, the slot 115 of the metal cavity 110 and the first feeding element 131 are excited to generate the first frequency band FB1, and the first feeding element 131 and the second feeding element 132 are excited to generate the second frequency band FB2. Since the first feeding element 131 and the second feeding element 132 are different lengths, they can generate different resonant modes, thereby increasing the bandwidth of the second frequency band FB2. It should be noted that the metal cavity 110 is capable of reflecting the back-side radiation. As a result, the slot antenna structure including the metal cavity 110 can generate only the front-side radiation, and it has higher antenna gain than the conventional design. In addition, because the metal cavity 110 can shield off nearby electromagnetic noise, the slot antenna structure of the invention is suitable for application in a variety mobile communication devices, and it is not negatively affected very much by the device's metal housing.

In some embodiments, the element sizes of the mobile device 100 are as follows. The length L1 of the metal cavity 110 is from 0.4 to 0.6 wavelength (0.4λ to 0.6λ) of the first frequency band FB1, and is preferably about 70 mm. The width W1 of the metal cavity 110 is from 0.05 to 0.15 wavelength (0.05λ to 0.15λ) of the first frequency band FB1, and is preferably about 11 mm. The width W1 of the metal cavity 110 is arranged for fine-tuning the first frequency band FB1. For example, when the width W1 of the metal cavity 110 increases, the first frequency band FB1 moves towards the low-frequency region; and when the width W1 of the metal cavity 110 decreases, the first frequency band FB1 moves towards the high-frequency region. The height H1 of the metal cavity 110 is preferably about 6 mm. In alternative embodiments, the sum (L1+W1+H1) of the length L1, the width W1, and the height H1 of the metal cavity 110 is from 0.55 to 0.8 wavelength (0.55λ to 0.8λ) of the first frequency band FB1, and is preferably 0.7 wavelength (0.7λ) of the first frequency band FB1. The length L2 of the slot 115 of the metal cavity 110 is from 0.45 to 0.55 wavelength (0.45λ to 0.55λ) of the first frequency band FB1, and is preferably about 65 mm. The length L3 of the small opening 116 of the metal cavity 110 is shorter than 0.1 wavelength (<0.1λ) of the first frequency band FB1, and is preferably about 3 mm. The above ranges of element sizes can cause the slot antenna structure to cover the dual-frequency operation of WLAN 2.4 GHz/5 GHz, and further prevent electromagnetic noise from entering the metal cavity 110 through the small opening 116. In addition, the distance D1 between the second feeding element 132 and the end of the slot 115 is substantially 0.5 wavelength (0.5λ) of the second frequency band FB2, and is preferably about 27 mm. Such a design can optimize the high-frequency impedance matching of the slot antenna structure, and increase the high-frequency bandwidth of the slot antenna structure.

Figure 3:
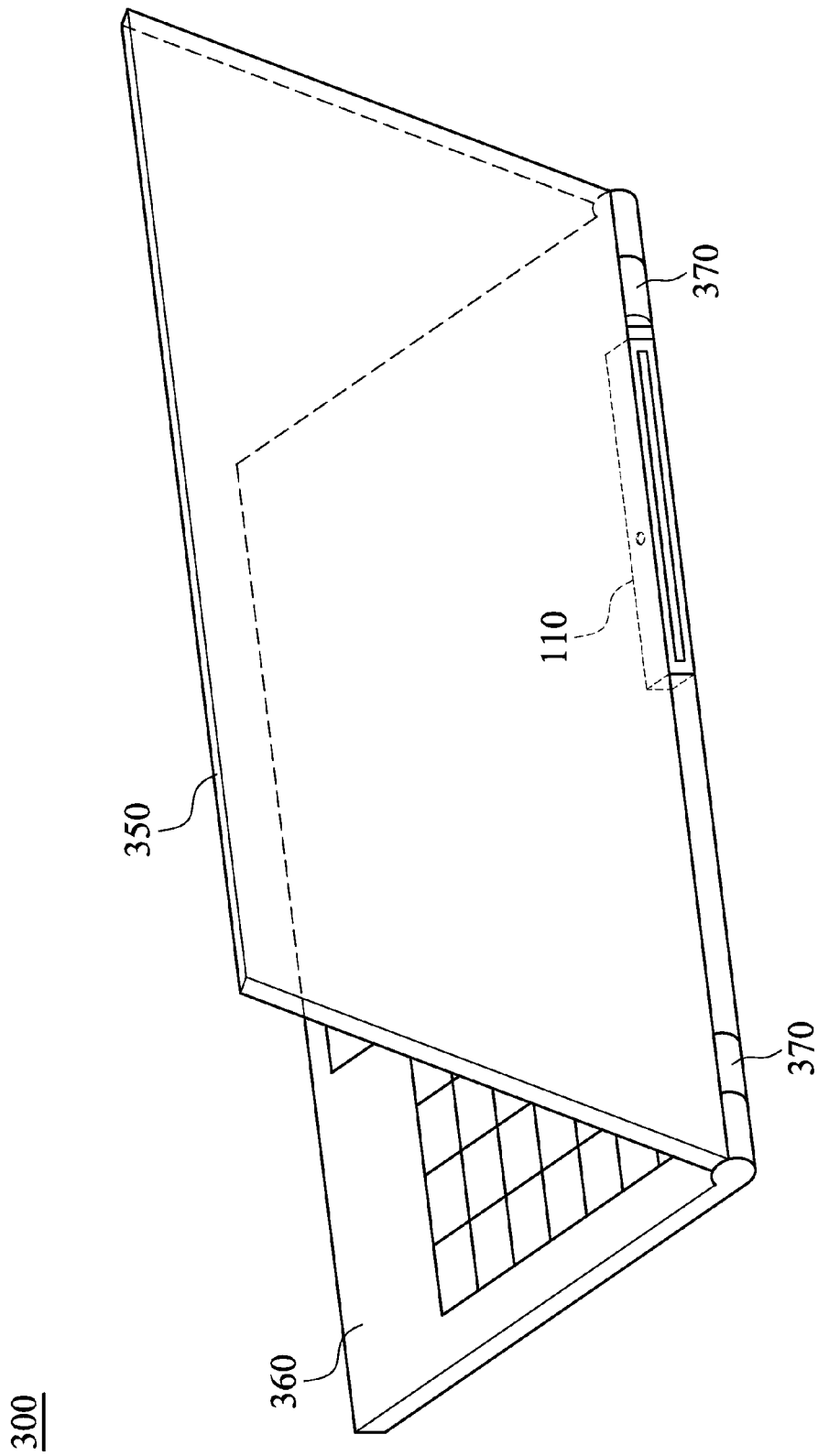
FIG. 3 is a perspective view of a mobile device according to an embodiment of the invention.

FIG. 3 is a perspective view of a mobile device 300 according to an embodiment of the invention. In the embodiment of FIG. 3, the mobile device 300 is a convertible notebook computer. Specifically, the mobile device 300 further includes an upper cover 350, a lower cover 360, and at least one hinge element 370. The upper cover 350 may include a display device. The lower cover 360 may include a keyboard. The hinge element 370 is electrically connected between the upper cover 350 and the lower cover 360. By controlling the hinge element 370, the mobile device 300 can operate in a notebook mode, a tent mode, or a tablet mode. The aforementioned slot antenna structure is adjacent to the hinge element 370, and is between the upper cover 350 and the lower cover 360. More particularly, the metal cavity 110 of the slot antenna structure can shield off the electromagnetic noise from a motherboard of the mobile device 300. In addition, since the slot antenna structure is positioned between the edge of the upper cover 350 and the edge of the lower cover 360, it does not tend to be interfered with by adjacent metal components (e.g., the A component, the B component, the C component, or the D component of notebook computer), regardless of the mobile device 300 operating in the notebook mode, the tent mode, or the tablet mode. Therefore, the slot antenna structure has good communication quality.

The invention proposes a novel mobile device and a slot antenna structure therein. In comparison to the conventional design, the invention has at least the advantages of (1) higher antenna gain, (2) wider high-frequency bandwidth, (3) better EMC (Electromagnetic Compatibility), (4) lower manufacturing cost, and (5) smaller antenna size. Therefore, the invention is suitable for application in a variety of small-size mobile communication devices.

Note that the above element sizes, element shapes, and frequency ranges are not limitations of the invention. An antenna designer can adjust these settings or values according to different requirements. It should be understood that the mobile device and the antenna structure of the invention are not limited to the configurations of FIGS. 1-3. The invention may merely include any one or more features of any one or more embodiments of FIGS. 1-3. In other words, not all of the features shown in the figures should be implemented in the mobile device and the antenna structure of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A mobile device, comprising:
    a metal cavity, wherein a slot is formed on a side wall of the metal cavity;
    a dielectric substrate, disposed in the metal cavity; and
    a feeding element, disposed on the dielectric substrate, and electrically connected to a signal source;
    wherein a slot antenna structure is formed by the metal cavity, the dielectric substrate, and the feeding element;
    wherein the dielectric substrate has an upper surface and a lower surface, the upper surface of the dielectric substrate is attached to the side wall, and the feeding element is disposed on the lower surface of the dielectric substrate.

2. The mobile device as claimed in claim 1, wherein the metal cavity is a hollow cuboid.

3. The mobile device as claimed in claim 1, wherein the slot has a straight-line shape.

4. The mobile device as claimed in claim 1, wherein the feeding element comprises a first feeding branch and a second feeding branch, and both the first feeding branch and the second feeding branch extend across the slot.

5. The mobile device as claimed in claim 1, wherein the slot antenna structure is excited to generate a first frequency band and a second frequency band, the first frequency band is from 2400 MHz to 2484 MHz, and the second frequency band is from 5150 MHz to 5850 MHz.

6. The mobile device as claimed in claim 5, wherein a length of the metal cavity is from 0.4 to 0.6 wavelength of the first frequency band.

7. The mobile device as claimed in claim 5, wherein a width of the metal cavity is from 0.05 to 0.15 wavelength of the first frequency band.

8. The mobile device as claimed in claim 1, wherein at least one small opening is further formed on a top plate of the metal cavity, and the top plate is perpendicular to the side wall.

9. The mobile device as claimed in claim 1, wherein the mobile device is a convertible notebook computer which comprises:
    an upper cover, comprising a display device;
    a lower cover, comprising a keyboard;
    a hinge element, electrically connected between the upper cover and the lower cover, such that the convertible notebook computer operates in a notebook mode, a tent mode, or a tablet mode, wherein the slot antenna structure is adjacent to the hinge element and is between the upper cover and the lower cover.

10. A mobile device, comprising:
    a metal cavity, wherein a slot is formed on a side wall of the metal cavity;
    a dielectric substrate, disposed in the metal cavity; and
    a feeding element, disposed on the dielectric substrate, and electrically connected to a signal source;
    wherein a slot antenna structure is formed by the metal cavity, the dielectric substrate, and the feeding element;
    wherein the feeding element comprises a first feeding branch and a second feeding branch, and both the first feeding branch and the second feeding branch extend across the slot.

11. A mobile device, comprising:
    a metal cavity, wherein a slot is formed on a side wall of the metal cavity;
    a dielectric substrate, disposed in the metal cavity; and
    a feeding element, disposed on the dielectric substrate, and electrically connected to a signal source;
    wherein a slot antenna structure is formed by the metal cavity, the dielectric substrate, and the feeding element;
    wherein at least one small opening is further formed on a top plate of the metal cavity, and the top plate is perpendicular to the side wall.

* * * * *